United States Patent Office 3,770,679
Patented Nov. 6, 1973

3,770,679
PROCESS FOR THE PREPARATION OF A POLY(VINYL ACETATE-DIALKYL MALEATE-ACRYLIC ACID) LATEX
Albert E. Corey, East Longmeadow, Donald D. Donermeyer, and Joel Fantl, Springfield, and Charles R. Williams, Longmeadow, Mass., assignors to Monsanto Company, St. Louis, Mo.
No Drawing. Filed Dec. 16, 1970, Ser. No. 98,913
Int. Cl. C08f 1/13, 29/34
U.S. Cl. 260—29.6 TA         16 Claims

ABSTRACT OF THE DISCLOSURE

Disclosed herein is a process for the preparation of a poly(vinyl acetate-di-lower alkyl maleate-acrylic acid) latex which comprises (1) interpolymerizing the monomers at a temperature of from 40 to 60° C. in a latex polymerization system using a surfactant system comprising a phosphate ester of an alkyl phenol-ethylene oxide condensate wherein the alkyl group contains 7 to 11 carbon atoms. The resulting latex has wide utility as a textile size.

BACKGROUND OF THE INVENTION

(1) Field of the invention

The present invention relates to a process for the preparation of a latex. More particularly, it relates to a process for the latex polymerization of a poly(vinyl acetate-dialkyl maleate-acrylic acid) wherein the dialkyl maleate is selected from the group consisting of dimethyl maleate and diethyl maleate. The resulting latex has wide utility as a textile size.

(2) The prior art

The use of synthetic resins as textile sizes is well known in the prior art. Notwithstanding the widespread use of synthetic resin for textile sizes, a need exists for a textile size which can be applied from aqueous or organic solvent solutions to a variety of yarns which are woven on conventional or water jet looms and then removed from the resulting fabric using aqueous or organic solvent solutions.

Synthetic resins made by the processes of the prior art usually fail in one or more respects to fulfill the above requirements. Many of the deficiencies of the sizes of the prior art are due to the composition of the size and to the processes by which the size is made.

SUMMARY OF THE INVENTION

The above-mentioned need in the prior art is fulfilled by the present invention which provides a process for the preparation of synthetic resin latex which is especially useful as a textile size for use on both conventional and water jet looms. More particularly, the present invention provides a process for the preparation of a latex which process comprises (1) interpolymerizing critical amounts of vinyl acetate, dialkyl maleate and acrylic acid monomers in a latex system at a temperature in the range of from 40 to 60° C. in the presence of a surfactant system comprising a phosphate ester of an alkyl phenol-ethylene oxide condensate.

The polymers prepared in accordance with the processes of the present invention have excellent solubility characteristics and film properties. Moreover, sizes prepared from these polymers are easily removed from sized yarns or the resulting fabric using aqueous alkali solutions or organic solvents. Consequently, these polymers are especially suitable for use as yarn warp sizes for use on conventional or water jet looms.

THE PREFERRED EMBODIMENTS

The monomers used in the interpolymerization processes of the present invention are vinyl acetate, a dialkyl maleate selected from the group consisting of dimethyl maleate and diethyl maleate and acrylic acid. The polymerization charge comprises from 83 to 95% by weight of vinyl acetate, from 2 to 10% by weight of dialkyl maleate and from 3 to 7% by weight of acrylic acid based on the total weight of the monomers. More preferably, the polymerization charge comprises from 87.5 to 91% by weight of vinyl acetate, from 5 to 7.5% by weight of dialkyl maleate and from 4 to 6% by weight of acrylic acid based on the total weight of the monomers.

The latex polymerization process of the present invention is carried out at a temperature in the range of from 40 to 60° C. and preferably at a temperature in the range of from 40 to 45° C. At temperatures below about 40° C. the polymerization rate is too slow and the reaction mass tends to coagulate. At polymerization temperatures above 60° C. the product is of low molecular weight and lacks the tensile strength and elongation required in sizes for use on water jet looms.

The surfactant system used in the processes of the present invention comprises a phosphate ester of an alkyl phenol-ethylene oxide condensate wherein the alkyl group contains from 7 to 11 carbon atoms. Especially preferred are the phosphate esters of tertiary octyl phenol-ethylene oxide condensates (hereinafter referred to as PEOPEO) and the phosphate esters of nonyl phenol-ethylene oxide condensates (PENPEO). These preferred surfactants are available commercially as Triton XQS (Rohm & Haas Company) and GAFAC RE–870 (General Aniline and Film Company), respectively. The amount of the phosphate ester of an alkyl phenol-ethylene oxide condensate used in the present invention will be in the range of from 1.0 to 4.0% by weight based on the total weight of the latex.

Preferably, the polymerization processes of the present invention are carried out using an anionic co-surfactant in combination with the phosphate esters of an alkyl phenol-ethylene oxide condensate. The use of the co-surfactants reduces the amount of coagulum in the resulting latex and provides a better product. The preferred co-surfactants used in the present invention include alkyl aryl sulfonates such as sodium dodecyl benzene sulfonate; fatty alcohol sulfates such as sodium lauryl sulfate; dialkyl sulfosuccinates, sodium dihexyl sulfosuccinate; etc.

The amount of co-surfactant used is in the range of 0.1 to 0.3% by weight and more preferably 0.15 to 0.25% by weight based on the total weight of the latex.

The polymerization processes of the present invention are initiated by a two component redox free radical initiator system. Suitable oxidizing components for the system are the inorganic peracid salts such as ammonium, potassium and sodium persulfates, perborates, and hydrogen peroxide. Preferred however, are the oil soluble organic hydroperoxides such as t-butyl hydroperoxide, cumene hydroperoxide, p-menthane hydroperoxide, etc. and esters of the t-butyl perbenzoate type. The useful reducing components include compounds like the sulfites, bisulfites, hydrosulfites and thiosulfites; ethyl and other alkyl sulfites; the sulfoxylates, such as sodium formaldehyde sulfoxylate; and the like. Especially preferred are initiator systems based on t-butyl hydroperoxide and sodium formaldehyde sulfoxylate; and redox combinations such as mixtures of hydrogen peroxide and an iron salt, hydrogen peroxide and zinc formaldehyde sulfoxylate or other similar reducing agent; hydrogen peroxide and a titanous salt; potassium persulfate and sodium bisulfate and a bromate mixed with a bisulfate.

The use of equimolar amounts of initiator system components is generally preferred although the amount of each component as well as the total amount of catalyst used depends on the type of component used as on other polymerization conditions and may range between .02 and 0.2% by weight of the total polymerization system, the preferred range being 0.02 to 0.06% for the oxidizing component and 0.04 to 0.1 for the reducing component.

The solids contents of the latices prepared by the processes of the present invention can be varied over a wide range. The preferred latices having a solids content in the range of from 15 to 65% by weight and more preferably from 35 to 55% by weight, based on the total weight of the latex.

During the polymerization reaction a conventional base such as ammonium hydroxide or sodium hydroxide is used to buffer the latex to a pH in the range of 4.0 to 6.0.

The following examples are set forth in illustration of the present invention and should not be construed as a limitation thereof. Unless otherwise indicated, all parts and percentages given are by weight and polymerization temperatures are maintained in the range of from 41 to 45° C.

PART A—PREPARATION OF LATICES

Example 1

A latex is prepared in conventional latex polymerization equipment while maintaining a nitrogen atmosphere and mild agitation using the following charge:

| Charge A: | Parts |
|---|---|
| Water | 62.03 |
| PEOPEO | 1.58 |
| Ammonium hydroxide (28%) | 0.20 |
| Sodium formaldehyde sulfoxylate | 0.05 |
| Charge B: | |
| T-butyl hydroperoxide (90%) | 0.03 |
| Dimethyl maleate (DMM) | 1.75 |
| Vinyl acetate (VOAC) | 31.67 |
| Acrylic acid | 1.58 |

The PEOPEO surfactant, ammonium hydroxide buffer solution, sodium formaldehyde sulfoxylate and the water are charged to a glass lined reaction vessel. The tertiary butyl hydroperoxide polymerization initiator is dissolved in the monomeric mixture and eight percent (8%) of the monomeric charge (charge B) is then dispersed in the charge A. The remaining 92% of the monomers (charge B) is added to the reaction vessel by a conventional delayed addition technique over a period of 2½ hours. During this time the temperature of the reaction batch is maintained in the range of from 41 to 45° C. while maintaining mild agitation.

The resulting latex has a total solids of 35.7%, a pH of 4.9 and a Brookfield viscosity of 23 centipoises. The polyvinyl acetate-dimethyl maleateacrylic acid) resin has a specific viscosity of 2.51 when measured as a 1% solution in dimethyl sulfoxide at 25° C. Other properties of this latex are tabulated in Table 1 below.

Examples 2 to 10

The following Examples 2 to 10 are set forth to illustrate variations in the latex polymerization reaction conditions of the present invention. In each case the general procedures of Examples 1 are followed except for the noted changes. The resulting latices have solids contents in the range of from 35 to 42% by weight and Brookfield viscosities in the range of from 10 to 50 cps. at 25° C. These examples are tabulated in the following Table I.

TABLE I.—SUMMARY OF EXAMPLES 1 TO 10

| Example | 1 | 2 | 3 | 4 | 5 | 6 | 7 | 8 | 9 | 10 |
|---|---|---|---|---|---|---|---|---|---|---|
| Charge A: | | | | | | | | | | |
| Water | 62.03 | 57.7 | 57.87 | 62.03 | 62.03 | 57.70 | 62.03 | 57.03 | 62.03 | 57.7 |
| PEOPEO | 1.58 | | | 1.58 | 1.58 | | 1.26 | 1.58 | 1.58 | |
| PENPEO | | 1.58 | 1.58 | | | 1.58 | | | | 1.58 |
| SDS | | 0.20 | 0.20 | 0.20 | 0.25 | 0.20 | 0.20 | 0.20 | 0.20 | 0.20 |
| NH$_4$OH (28%) | 0.20 | 0.39 | 0.39 | 0.20 | | | .020 | 0.39 | 0.20 | 0.39 |
| NaOH | | | | | 0.18 | 0.18 | | | | |
| Charge B: | | | | | | | | | | |
| Total monomer | 35 | 40.0 | 40.0 | 35.0 | 35.0 | 40.0 | 35 | 40 | 35 | 40 |
| Percent vinyl acetate | 90.5 | 86.65 | 91.65 | 90.5 | 86.5 | 90.5 | 90.5 | 89.5 | 90.5 | 90.5 |
| Percent dialkyl maleate | 5.0 | 10.0 | 5.0 | 5.0 | 7.5 | 5.0 | 5.0 | 5.0 | 5.0 | 5.0 |
| Percent acrylic acid | 4.5 | 3.35 | 3.35 | 4.5 | 6.0 | 4.5 | 4.5 | 5.5 | 4.5 | 4.5 |
| Percent total coagulum | 0.68 | 0.02 | 0.16 | <0.2 | 0.05 | 0.15 | 0.08 | 0.07 | 0.04 | |
| Polymer properties: | | | | | | | | | | |
| Specific viscosity | 2.51 | 1.38 | 1.64 | 2.31 | 2.93 | 2.85 | 2.92 | 6.05 | 2.78 | 2.58 |
| Tensile/percent elongation: | | | | | | | | | | |
| Dry, 65% R.H. | 3,190/288 | 5,130/110 | 2,350/380 | 2,900/283 | 2,150/320 | 3,320/370 | | | 3,560/423 | 3,040/360 |
| Wet | 1,770/442 | 2,030/310 | 1,530/430 | 2,310/541 | | 720/590 | | | 2,000/574 | 1,440/470 |
| Dry, 80% R.H. | | | | | 2,340/370 | | | 3,260/350 | | |

In the foregoing table 1% total coagulum refers to all coagulum produced, both filterable and remaining as fouling on the impeller and walls of the reactor. This value is measured by recovering the coagulum by filtration and by scraping from the equipment, drying it, weighing it, and calculating its percent weight based on the calculated solids. Values in excess of 0.75% indicate that objectionable kettle fouling would occur in commercial scale batches which would cause serious problems in product yields, product handling and equipment clean-up.

Specific viscosity measurements are made on 1% solutions in dimethyl sulfoxide at 25° C.

Tensile (p.s.i.) and elongation are measured according to ASTM Method D–882–67 after conditioning at 65% and 80% relative humidity. The wet values are obtained on 4 mil films which are immersed in water for five (5) minutes.

Example 9 uses diethyl maleate as the dialkyl maleate component while all of the other examples use dimethyl maleate. Examples 1, 4, 5 and 7 to 9 use a phosphate ester of an octyl phenol-ethylene oxide condensate (PEOPEO) while the other examples use a phosphate ester of a nonyl phenol-ethylene oxide condensate (PENPEO). Example 1 uses a single surfactant while Examples 2 to 10 use a combination of a major amount of PEOPEO or PENPEO with a minor amount of sodium dihexyl sulfosuccinate (SDS) which is available commercially as Aerosol M.A. from American Cyanamid. Note in Examples 2 to 10 that when a combination of surfactants is used, the percent total coagulum is significantly lower than in Example 1 wherein a single surfactant is used.

Examples 1 to 4 and 7 to 10 are prepared using ammonium hydroxide as the buffer agent while Examples 5 and 6 use sodium hydroxide. The high wet tensile strength of the polymers prepared in Examples 1 to 5 and 7 to 10 using ammonium hydroxide, indicate their suitability for use as a size in a water jet weaving process.

The polymeric products of Examples 2 and 3 contain only 3.35% acrylic acid monomer. These polymers have good water resistance, tensile and elongation making these polymers very suitable for use in water jet weaving processes using organic solvent desizing methods.

In order to be suitable for use as sizes in the water jet weaving process the polymeric size must have a good tensile strength, toughness and adhesion to the yarn under wet conditions. The specific viscosities of the polymers of the present invention are good indices as to wet tensile strength and toughness when considered in the context of the type and amount of comonomers present in the polymer. The preferred polymers of the present invention have a specific viscosity in the range of from 1.2 to 12.0 and more preferably in the range of from 1.3 to 10.0.

The correlation between specific viscosity of the polymers of the present invention and wet tensile strength are shown in the following Table II wherein five series of polymers are prepared using the general procedures of Examples 2 to 10 above. Variations in the amount of catalyst and polymerization temperatures lead to variations in the specific viscosity of the resulting polymers. These polymers are then tested for wet tensile strength and the results are tabulated in the following Table II.

TABLE II.—CORRELATION OF WET TENSILE STRENGTH WITH SPECIFIC VISCOSITY

|  | Polymer specific viscosity | Wet tensile strength (p.s.i.) |
| --- | --- | --- |
| Polymer series:[1] | | |
| A-1 | 0.7 | 570 |
| A-2 | 1.0 | 1,060 |
| A-3 | 1.64 | 1,500 |
| A-4 | 1.94 | 2,000 |
| B-1 | 1.80 | 1,480 |
| B-2 | 1.82 | 1,650 |
| B-3 | 2.08 | 1,820 |
| B-4 | 2.31 | 2,310 |
| B-5 | 2.38 | 2,450 |
| B-6 | 2.84 | 2,610 |
| C-1 [2] | 2.22 | 2,480 |
| C-2 [2] | 3.71 | 3,500 |
| D | 2.78 | 2,000 |
| E | 1.79 | 680 |

[1] Polymers are prepared using the following percent by weight monomeric charges: A=vinyl acetate/dimethyl maleate/acrylic acid, 91.65/5.0/3.35; B=vinyl acetate/dimethyl maleate/acrylic acid, 90.5/5/4.5/ C=vinyl acetate/dimethyl maleate/acrylic acid, 90/5/5; D=vinyl acetate/diethyl maleate/acrylic acid, 90.5/5/4.5; E=vinyl acetate/dibutyl maleate/acrylic acid, 91.65/5/3.35.
[2] Tensile values for C-1 and C-2 are determined at 80% R.H.

The data in the foregoing Table II illustrate that in a given series, using the prescribed dimethyl maleate and diethyl maleate monomers of the present invention, the greater the specific viscosity the greater is the wet tensile strength. On the other hand, Series E prepared using dibutyl maleate has very low wet tensile strength as compared to comparable polymers having approximately the same specific viscosity. In this regard attention is directed to a comparison between Series E and Series A-3, A-4, B-1 and B-2.

Examples 11 to 13

The following Examples 11 to 13 are set forth as control examples to illustrate the effect of polymerization temperature on the physical properties of the resulting latex. In each example the general charge and procedure of Example 10 is repeated while the polymerization temperature is varied. The specific viscosity of the resulting polymer is then measured. The results are tabulated in Table III below.

TABLE III.—SUMMARY OF EXAMPLES 11 TO 13

|  | Polymerization temp., °C. | Specific viscosity |
| --- | --- | --- |
| Example: | | |
| 10 | 40-45 | 2.58 |
| 11 | 35-39 | ([1]) |
| 12 | 46-50 | 2.12 |
| 13 | 51-55 | 2.03 |

[1] Run coagulated.

The data in the foregoing Table III indicates that, within the framework of the present invention polymerization temperatures below 40° C. lead to coagulation while increasing temperatures above 45° C. lead to polymers with decreasing specific viscosities. However, for any given polymer system within the framework of the present invention, optimum specific viscosity is obtained when the polymerization reaction is in the range of from 40 to 60° C. and more preferably from 40 to 50° C.

The following Examples 14 to 19 are set forth to further illustrate the criticalities of the present invention.

Example 14

The general charge and procedure of Example 3 is repeated here except that fumaric acid is substituted for the acrylic acid used in Example 3. The reactants are mixed and heated. No significant polymerization reaction has taken place even after 24 hours.

Example 15

Example 14 is repeated here except using crotonic acid in place of fumaric acid. The polymerization is carried out for 5¼ hours. At the end of this time, the reaction mixture is found to contain 9% by weight of free monomer based on the total latex weight. This low conversion rate makes the polymer process unacceptable for use on a commercial scale. Moreover, the polymer is found to have a specific viscosity of only 1.1 and is unacceptable for use as a size in a water jet weaving process.

Example 16

In this example 88% by weight of vinyl acetate, 5% by weight of dimethyl maleate and 7% by weight of monomethyl maleate are interpolymerized according to the general procedure of Example 10.

The monomethyl maleate monomer is being used in place of the acrylic acid used in Example 10. The resulting polymer is found to have a specific viscosity of 1.8. Tensile strength of 1880 p.s.i. dry and 1060 p.s.i. wet and elongation of 200% dry and 500% wet. The low wet tensile strength of this polymer coupled with poor wet adhesion to acetate fibers and film insolubility in aqueous alkali, makes it unacceptable for use as a size in a water jet weaving process.

Example 17

In this example dibutyl maleate is used in place of the dimethyl maleate and diethyl maleate used in Examples 1 to 10 above. The general polymerization procedures used in Example I are followed here using 91.65% by weight of vinyl acetate, 5.0% by weight of dibutyl maleate and 3.35% by weight of acrylic acid. The resulting polymer has a specific viscosity of 1.79, tensile strength of 2050 p.s.i. dry and 680 p.s.i. et and elongation of 230% dry and 240% wet. The lowest tensile strength of this polymer makes it unacceptable for use as a size in water jet weaving process.

Example 18

In this example methyl methacrylate is used in place of the dimethyl maleate used in Examples 1 to 8 and 10 above. The general polymerization methods of Example 4 are used here using a monomer charge of 89% by weight of vinyl acetate, 5% by weight of methyl methacrylate and 6% by weight of acrylic acid. The reaction mixture coagulated and no polymer was obtained for testing.

Example 19

In this example acrylonitrile is used in place of the dimethyl maleate used in Examples 1 to 8 and 10 above. The general polymerization methods of Example 4 are followed using a monomer charge of 90% by weight of vinyl acetate, 5% by weight of acrylic acid.

After four hours reaction time only 6.5% of the monomers have been converted into polymer.

Example 20

This example illustrates the criticality of using a surfactant which is a phosphate ester of an alkyl phenolethylene oxide condensate, Example 4 is repeated here except that octyl phenol-ethylene oxide condensate is used as the surfactant in place of the phosphate ester of octyl phenol-ethylene oxide condensate used in Example 4. The octyl phenol-ethylene oxide condensate used in this example is a well-known surfactant which is available commercially as Triton X-405 from Rohm and Haas. After three hours reaction time the batch was completely coagulated.

Example 21

Example 20 is repeated here except using a surfactant which is a phosphate ester of an aliphatic alcohol-ethylene oxide condensate. After three hours reaction time the batch was completely coagulated.

PART B

Testing of the latices of Examples 1 to 5 and 7 to 10 as textile sizes

The latices prepared in Examples 1 to 10 are tested in order to determine their suitability as yarn sizes in both conventional and water jet weaving processes. The sizes are prepared by dissolving the latex in a basic solution such as ammonium hydroxide or sodium hydroxide solution. Other basic solutions may be used to dissolve the latices as for example, solutions of alkali and alkaline earth metal hydroxides as well as aqueous solutions of methylamine, dimethylamine, trimethylamine, ethylamine, diethylamine, triethylamine, n-propyl amine, n-butyl amine, morpholine, etc.

The key properties considered in these tests are listed below:

Solubility—all of the latices in question are soluble in fugitive bases such as aqueous ammonium hydroxide to provide sizing solutions.

Sizing solutions—prepared from the latices of Examples 1 to 5 and 7 to 10 have Brookfield viscosities in ther range of from 1 to 300 centipoises at 4 to 5% solids allowing ease of application to the yarn.

Wet tensile strength—films prepared from the latices of the present invention have wet tensile strength in excess of 1000 p.s.i. and the necessary toughness and film integrity required in water jet sizes.

Percent elongation—these values further indicate that the latices in question have the necessary film toughness required in water jet sizes.

Adhesion—the latices of Examples 1 to 5 and 7 to 10 have been tested and found to have good adhesion to the folloing yarns: filaments, acetate, polyester, rayon, texturized polyester, nylon; spun polyester, cotton, rayon and wool; acetate, nylon and blends thereof.

Resolubility in mild alkali-dried films of the latices in question are readily soluble in tetrasodium pyrophosphate-surfactant solutions which indicates that the size is easily removed from the woven fabric. The size is also soluble in chlorinated solvents used in desizing operations.

Size efficiency—is a measure of the amount of size add-on required in a given operation. The add-on is the amount of size that must be applied to the yarn in order to permit it to be woven on a water jet loom. In general, the less size add-on required, the more efficient the size. Sizes prepared from the latices of the present invention have excellent efficiency as is indicated by the following Examples 22 to 24.

Example 22

A latex composition is prepared as in Example 10 above using monomeric charge of 90.5% by weight of vinyl acetate, 5% by weight of dimethyl maleate and 4.5% by weight of acrylic acid. The resulting latex, wherein the polymer component has a specific viscosity of 2.7, is dissolved in aqueous ammonium hydroxide to give a 5.0% solids solution having a pH of 9.0.

This sizing solution at 120° F. is applied to a 150 denier, 41 monofilament, low twist bright acetate yarn on a commercial eleven can slasher at a rate of 90 yards per minute for a size add-on of 2.1%. Drying can temperatures on the slasher are 185/200/200/215/220/220/230/220/210/80/130° F. respectively. The split is very easy, and no ends break out at start-up.

The sized warp is entered into a Nissan Prince water jet loom, where at 400 picks per minute the weaving operation runs at very high efficiency (>98%) with no second quality fabric produced. The woven fabric has a "dry" appearance in contrast to warps woven with lower M.W. (specific viscosity of 0.7) materials which become "wet" and slimy. Successive warps show the same excellent performance. This fabric was desized in a conventional process by scouring in tetrasodium pyrophosphate wetting baths. The size is also removable in a chlorinated solvent scouring process.

Example 23

Example 22 is repeated here using a latex with a specific viscosity of 2.73. This latex is dissolved with aqueous ammonium hydroxide to give a 4.5% solids solution having a pH of 9.2. The size is applied to a 75 denier 20 monofilament low twist (75/20/LT) bright acetate yarn on a seven can slasher. The slasher is run at 25 yards per minute at a size add-on of 1.9% using drying can temperatures of 150/170/210/160/190/150/cold, respectively. The warp splits very easily and weaves at very high efficiency to give good quality fabric which is desized as in Example 22.

Example 24

This example is set forth to illustrate the exceptional efficiency of the sizes prepared according to the processes of the present invention. Example 22 is repeated here using a latex with a specific viscosity of 2.73. This latex is dissolved with aqueous ammonium hydroxide to give a 4.5% solids solution having a pH of 9.2. The size is applied to a 150 denier, 40 monofilament, 0.8 twist (150/40/0.8) bright acetate yarn on a seven can slasher at 55 yards per minute at a size add-on of 1.6%. Drying can temperatures are 190/210/210/210/190/cool. The warp splits very easy, and no ends break out during the sizing operation. The warp weaves at very high efficiency to give good quality fabric which is desized as in Example 22. The add-on rate (1.6%) used in this example is unusually low when compared to the sizes of the prior art which must be used in much larger amounts.

Sizes which are obtained from polymers prepared by the processes of the present invention are compared to commercially available textile sizes. The results of these comparisons is set forth below. In these tests the toughness value is the product of tensile times elongation.

Various sizes in the form of ammonium salts are applied to acetate and polyester filaments under water jet conditions. The size is tested for wet tensile, wet elongation, wet toughness and wet adhesion. The results are tabulated in the following Table IV.

TABLE IV.—TESTS ON WATER JET SIZE ON ACETATE AND POLYESTER FILAMENT

| Size | Composition [1] | Specific viscosity | Tensile (p.s.i.) | Percent elongation | Toughness (X10[4]) | Adhesion [2] Acetate | Polyester |
|---|---|---|---|---|---|---|---|
| A | VA/DMM/AA, 90.5/5/4.5 | 2.36 | 2150 | 540 | 116 | Excellent | Good. |
| B | VA/DBM/AA, 91.65/5/3.35 | 1.79 | 700 | 250 | 17.5 | Poor | Poor. |
| C | VA/CA, 96/4 | 0.7 | 750 | 200 | 15 | Good | Good. |
| D | VA/MMM, 93/7 | 1.4 | 700 | 400 | 28 | Fair | Poor. |
| E | VA/MIBM, 79/21 | 1.9 | 60 | 540 | 3.2 | Good | Do. |
| F | VA/MA, 47/53 | | 0 | | 0 | Poor | Do. |
| G | AA/AE | | 480 | 200 | 9.6 | Good | Excellent. |

[1] Values are in weight percent. VA=vinyl acetate; DMM=dimethyl maleate; DBM=dibutyl maleate; MMM=monomethyl maleate; MIBM=monoisobutyl maleate; AA=acrylic acid; CA=crotonic acid; MA=maleic anhydride; AE=acrylate ester.
[2] Qualitative adhesion tests are run under wet conditions on fiber imbedded into size.

Size A is obtained from a latex that is prepared according to the processes of the present invention. Sizes C to G are commercially available sizes which are representative of the prior art. Note that Size A has good to excellent adhesion and is at least five (5×) tougher than the sizes of the prior art.

Conventional size on acetate, rayon and texturized polyester

Various sizes in the form of sodium salts are applied to filament acetate, rayon filament and texturized polyester. The sizes are then tested under conditions of 65% R.H. for tensile, elongation, toughness and adhesion. The results are tabulated in the following Table V.

TABLE V.—CONVENTIONAL SIZE ON ACETATE, RAYON AND TEXTURIZED POLYESTER

| Size [1] | Tensile (p.s.i.) | Percent elongation | Toughness | Adhesion [2] | | |
|---|---|---|---|---|---|---|
| | | | | Acetate | Rayon | Polyester |
| A | 3,060 | 370 | 113 | 44 | High | 20 |
| B | 1,580 | 300 | 47 | 36 | ...do | 12 |
| C | 2,000 | 200 | 40 | 30 | ...do | 18 |
| D | 2,250 | 160 | 36 | 30 | ...do | 14 |
| E | 1,400 | 400 | 56 | 27 | ...do | 16 |
| F | 500 | 500 | 25 | | | 30 |
| G | 5,300 | 50 | 26 | | High | |
| H | 1,800 | 30 | 5 | 9 | ...do | |

[1] Compositions A to F are the same as in Table IV above except that A has a specific viscosity of 2.94; G is a commercial gelatin size; H is an equimolar styrene-maleic anhydride copolymer.
[2] Numerical values are pounds required to break ½ x ¼ inch lap joints.

Size A, which is obtained from a latex prepared according to the process of the present invention, exhibits greater toughness and better adhesion than the sizes of the prior art.

Loom finish acetate and nylon sizes

Various sizes in the form of ammonium salts are applied to acetate and nylon filament yarns. In the acetate application the size remains on the resulting fabric as a loom finish. Sizes used in this application must be very resistant to water spotting. The sizes are then tested under conditions of 65% R.H. for tensile, elongation, toughness and adhesion. The results are tabulated in the following Table VI.

TABLE IV.—LOOM FINISH ACETATE AND NYLON SIZES

| | Tensile (p.s.i.) | Percent elongation | Toughness (×10⁴) | Adhesion (lbs.) [1] | |
|---|---|---|---|---|---|
| | | | | Acetate | Nylon |
| Size [1]: | | | | | |
| A | 3,450 | 370 | 128 | 19 | 13 |
| B | 2,060 | 230 | 47 | 40 | 9 |
| C | 1,660 | 130 | 22 | 27 | 11 |
| D | 2,250 | 160 | 36 | 14 | 16 |
| E | 3,830 | 20 | 8 | 14 | 11 |
| Polyvinyl alcohol | 2,000 | 500 | 100 | | 15 |

[1] Compositions A to E same as in Table IV above except that A has a specific viscosity of 2.66. The polyvinyl alcohol used is a partially hydrolyzed low molecular weight polymer which cannot be used as a loom finish because of its water sensitivity.
[2] Tested as in Table V.

Once again, Size A, which is representative of the sizes of the present invention, shows superior toughness. The adhesion of this size to acetate and nylon further indicate its utility as a textile size.

Spun sizes for aqueous removable and solvent removable applications

In certain applications it is desirable to size yarns such as cotton, rayon, wool, polyester and blends thereof and then remove the size from the resulting fabric using either aqueous alkali or an organic solvent. In the following tests various sizes are applied to polyester and then tested under conditions of 80% R.H. for tensile, elongation, toughness, adhesion and solubility. The test results are tabulated in the following Table VII.

TABLE VII.—SPUN SIZES FOR AQUEOUS REMOVABLE AND SOLVENT REMOVABLE APPLICATIONS

| | Tensile (p.s.i.) | Percent elongation | Toughness (×10⁴) | Adhesion (p.s.i.) [2] | Solubility [3] | |
|---|---|---|---|---|---|---|
| | | | | | Aqueous | Organic |
| Size [1]: | | | | | | |
| A | 3,500 | 360 | 126 | 180 | Yes | Yes |
| B | 1,000 | 400 | 40 | 100 | Yes | Yes |
| C | 1,500 | 200 | 30 | 150 | Yes | Yes |
| D | 2,000 | 200 | 40 | 80 | Yes | No |
| E | 650 | 620 | 40 | 100 | Yes | No |
| PVOH-PH | 4,800 | 420 | 190 | 180 | Yes | No |
| PVOH-FH | 6,600 | 320 | 210 | 40 | Yes | No |
| CMC/binder | 2,800 | 60 | 17 | 70 | Yes | No |
| Starch/binder | 2,700 | 30 | 8 | 60 | Yes | No |

[1] Compositions A to E same as in Table IV above except that A has a specific viscosity of 3.71 and a VA/DMM/AA composition of 90/5/5% by weight. PVOH-PH is a high molecular weight partially hydrolyzed polyvinyl alcohol. PVOH-FH is a high molecular weight fully hydrolyzed polyvinyl alcohol. CMC/binder is a blend of carboxymethyl cellulose and an acrylate binder. Starch/binder is a blend of starch and an acrylate binder.
[2] Adhesion tests are run on a ½ square inch polyester to wood board bond.
[3] The aqueous solution contains a tetrasodium pyrophosphate-wetting agent combination. The organic solvent used is trichloroethylene.

Size A which is representative of the sizes of the present invention exhibits excellent toughness and adhesion. Moreover, this material is removable in conventional aqueous desizing operations as well as in organic solvent desizing operations. This latter feature is especially important where water shortages or water pollution problems exist.

Another feature of the present invention is the fact that the polymeric material may be dissolved in organic solvents to form a size. This feature is especially desirable in certain applications wherein solvent size removal techniques are also employed. In such applications the polymer solids are recovered from the latex, using conventional means. The polymer solids are then dissolved in an organic solvent to form the textile size and the size in the form of an organic solvent solution is applied. Size removal may be accomplished using aqueous alkali or organic solvent methods.

Preferred organic solvents used in preparing the sizes are alcohols, ketones, esters and aromatic solvents. Especially preferred are chlorinated aliphatic hydrocarbons such as methylene chloride, methylene bromide, chloroform, bromoform, ethylene dichloride, ethylene dibromide, ethylidene chloride, ethylidene bromide, s-tetrachloroethane, hexachloroethane, s-dichloroethylene, 1,1,1-trichloroethane, 1,1,2-trichloroethane, trichloroethylene, trimethylenebromide, trichlorobromoethane, trichloromethane, 1,2,3-trichloropropane, 1,1,2-trichloropropane, trifluoro-1,2-tribromoethane, trifluoro-1,1,2-tribromoethane, trifluoro-1,1,2-trichloroethane, 2,2-dichloro-1-bromoethane, 1,3-dichloro - 2 - methyl-propane, 1,2-dichloro-2-methyl-propane, 1,1-diiodothane and the like. Chlorinated aliphatic liquid hydrocarbons are preferred in the practice of this invention because of their generally lower cost, greater availability and the ease with which these solvents may be handled.

From the foregoing, it should be obvious that many variations are possible in the present invention without departing from the spirit and scope thereof.

What is claimed is:

1. A process for the preparation of an aqueous latex of solids content in the range of 15 to 65 percent by weight suitable for use as a textile size which process comprises interpolymerizing from 83 to 95% by weight of vinyl acetate, from 2 to 10% by weight of a dialkyl maleate selected from the group consisting of dimethyl maleate and diethyl maleate and from 3 to 7% by weight of acrylic acid based on the total weight of the monomers, at a temperature in the range of 40 to 60° C., in a latex polymerization system with a redox catalyst and a surfactant which is phosphate ester of tertiary octyl phenol-ethylene oxide condensate wherein the alkyl group contains 7 to 11 carbon atoms, and wherein the resulting interpolymer has a specific viscosity in the range of of 1.2 to 12.0 when measured as a 1% solution in dimethyl sulfoxide at 25° C.

2. A process as in claim 1 wherein the amount of vinyl acetate is in the range of from 87.5 to 91% by weight, the amount of dialkyl maleate is in the range of from 5 to 7.5% by weight and the amount of acrylic acid is in the range of from 4 to 6% by weight.

3. A process as in claim 1 wherein the dialkyl maleate is dimethyl maleate.

4. A process as in claim 1 wherein the surfactant is a phosphate ester of tertiary octyl phenol-ethylene oxide condensate comprising between 1 and 4% by weight of the total weight of the latex.

5. A process as in claim 1 wherein the surfactant is a phosphate ester of nonyl phenol-ethylene oxide condensate comprising between 1 and 4% by weight of the total weight of the latex.

6. A process as in claim 1 wherein the polymerization temperature is in the range of from 40° to 50° C.

7. A process for the preparation of an aqueous latex of solids content in the range of 15 to 65 percent by weight suitable for use as a textile size which process comprises interpolymerizing at a temperature in the range of from 40 to 50° C., from 87.5 to 91% by weight of vinyl acetate, from 5 to 7.5% by weight of a dimethyl maleate and from 4 to 6% by weight of acrylic acid based on the total weight of the monomers, in a latex polymerization system with a redox catalyst and a surfactant which is a phosphate ester of an alkyl phenol-ethylene oxide condensate wherein the alkyl group contains 7 to 11 carbon atoms, the surfactant comprising between 1 and 4% by weight of the total weight of the latex, wherein the resulting interpolymer has a specific viscosity in the range of 1.2 to 12.0 when measured as a 1% solution in dimethyl sulfoxide at 25° C.

8. A process as in claim 7 wherein the surfactant is a phosphate ester of tertiary octyl phenol-ethylene oxide condensate.

9. A process as in claim 7 wherein the surfactant is a phosphate ester of nonyl phenol-ethylene oxide condensate.

10. A process for the preparation of a latex suitable for use as a textile size which process comprises interpolymerizing at a temperature in the range of from 40 to 50° C. from 87.5 to 91% by weight of vinyl acetate, from 5 to 7.5% by weight of a dimethyl maleate and from 4 to 6% by weight of acrylic acid based on the total weight of the monomers, in a latex polymerization system using a surfactant which is selected from the group consisting of a phosphate ester of nonyl phenol-ethylene oxide condensate and a phosphate ester of tertiary octyl phenol-ethylene oxide condensate.

11. A latex suitable for preparation of a textile size which consists essentially of an interpolymer of from 83 to 95% by weight of vinyl acetate, from 2 to 10% by weight of a dialkyl maleate selected from the group consisting of dimethyl maleate and diethyl maleate and from 3 to 7% by weight of acrylic acid based on the total weight of the monomers, of specific viscosity in the range of 1.2 to 12.0, in an aqueous dispersion containing between 15 and 65% by weight of interpolymer and between 1 and 4% by weight of a phosphate ester of an alkyl phenol-ethylene oxide condensate wherein the alkyl group contains 7 to 11 carbon atoms.

12. A latex as in claim 14 wherein the amount of vinyl acetate is in the range from 87.5 to 91%, the amount of dialkyl maleate is in the range of from 5 to 7.5% by weight and the amount of acrylic acid is in the range of from 4 to 6% by weight.

13. A latex as in claim 14 wherein the dialkyl maleate is dimethyl maleate.

14. A process for the prepartion of an aqueous latex of solids content in the range of 15 to 65 percent by weight suitable for use as a textile size which process comprises interpolymerizing from 83 to 95% by weight of vinyl acetate, from 2 to 10% by weight of a dialkyl maleate selected from the group consisting of dimethyl maleate and diethyl maleate and from 3 to 7% by weight of acrylic acid based on the total weight of the monomers, at a temperature in the range of 40 to 60° C., in a latex polymerization system with a redox catalyst, a surfactant which is a phosphate ester of an alkyl phenol-ethylene oxide condensate wherein the alkyl group contains 7 to 11 carbon atoms and a co-surfactant selected from the group consisting of alkylaryl sulfonates, fatty alcohol sulfates and dialkyl sulfosuccinates, wherein the resulting interpolymer has a specific viscosity in the range of 1.2 to 12.0 when measured as a 1% solution in dimethyl sulfoxide at 25° C.

15. A process for the preparation of an aqueous latex of solids content in the range of 15 to 65 percent by weight suitable for use as a textile size which process comprises interpolymerizing at a temperature in the range of from 40 to 50° C., from 87.5 to 91% by weight of vinyl acetate, from 5 to 7.5% by weight of a dimethyl maleate and from 4 to 6% by weight of acrylic acid based on the total weight of the monomers, in a latex polymerization system with a redox catalyst and a surfactant which is a phosphate ester of an alkyl phenol-ethylene oxide condensate wherein the alkyl group contains 7 to 11 carbon atoms, the surfactant comprising between 1 and 4% by weight of the total weight of the latex and a co-surfactant selected from the group consisting of alkylaryl sulfonates, fatty alcohol sulfates and dialkyl sulfosuccinates comprising between 0.1 and 0.3% by weight of the total weight of the latex, wherein the resulting interpolymer has a specific viscosity in the range of 1.2 to 12.0 when measured as a 1% solution in dimethyl sulfoxide at 25° C.

16. A latex suitable for preparation of a textile size which consists essentially of an interpolymer of from 83 to 95% by weight of vinyl acetate, from 2 to 10% by weight of a dialkyl maleate selected from the group consisting of dimethyl maleate and diethyl maleate and from 3 to 7% by weight of acrylic acid based on the total weight of the monomers, of specific viscosity in the range of 1.2 to 12.0, in an aqueous dispersion containing between 15 and 65% by weight of interpolymer, between 1 and 4% by weight of a phosphate ester of an alkylphenol-ethylene oxide condensate wherein the alkyl group contains between 7 and 11 carbon atoms and between 0.1 and 0.3 percent by weight of a co-surfactant selected from the group consisting of alkylaryl sulfonates, fatty alcohol sulfates and dialkyl sulfosuccinates.

References Cited
UNITED STATES PATENTS

| | | | |
|---|---|---|---|
| 2,853,471 | 9/1958 | Beadell | 260—29.6 MP |
| 3,231,534 | 1/1966 | Blades et al. | 260—29.6 TA |
| 3,449,282 | 6/1969 | Lasher et al. | 260—29.6 MP |
| 3,535,292 | 10/1970 | Castrantas et al. | 260—78.5 E |

WILLIAM H. SHORT, Primary Examiner

L. M. PHYNES, Assistant Examiner

U.S. Cl. XR.

117—138.8 UA, 139.5 A, 161 UT; 260—29.6 MP, 29.6 MQ, 78.5 B, UA & E